UNITED STATES PATENT OFFICE 2,492,276

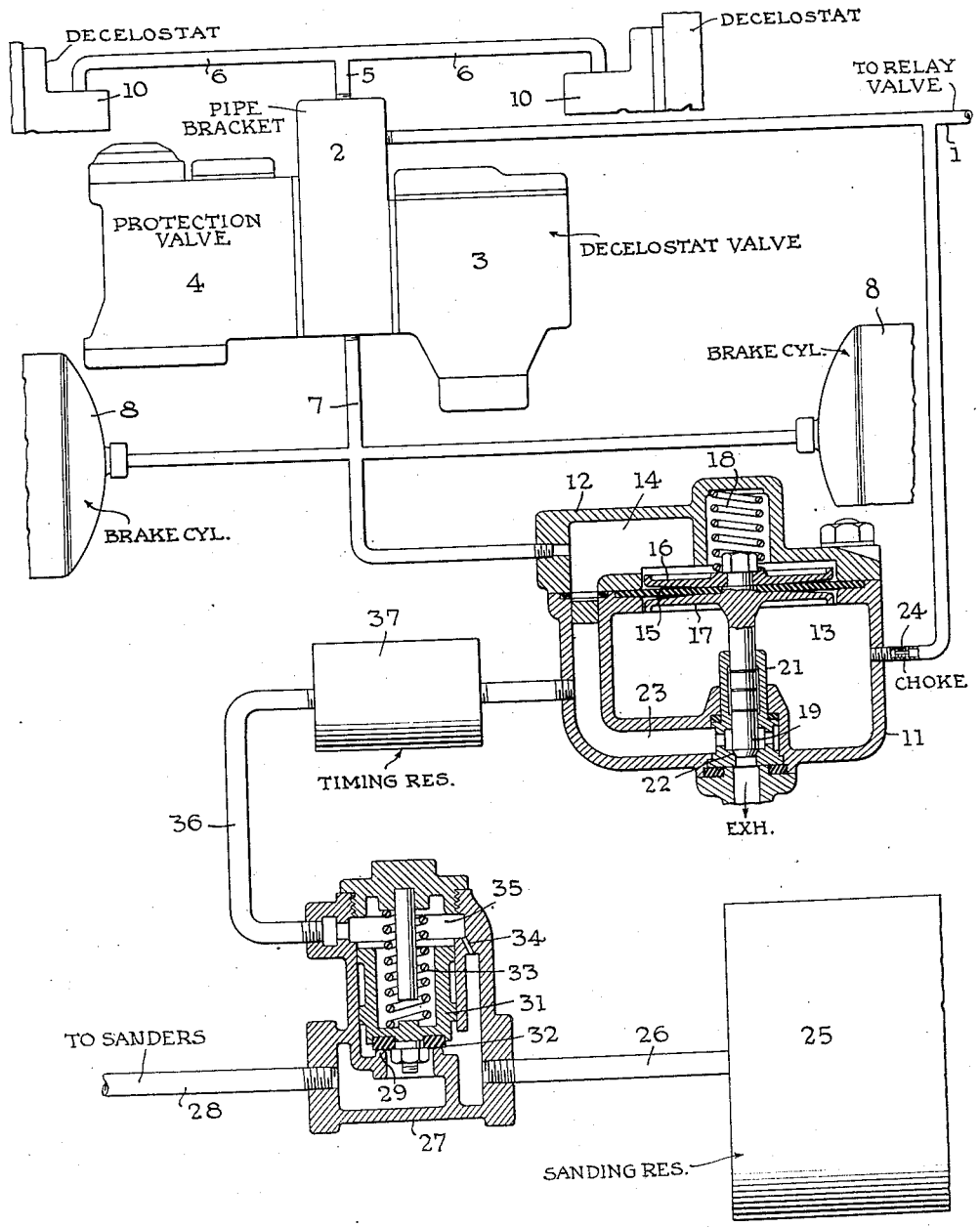

TIMED TRACK SANDER CONTROL

John Van Varick Elsworth, Watertown, N. Y., assignor to The New York Air Brake Company, a corporation of New Jersey Application October 3, 1946, Serial No. 700,868

4 Claims. (Cl. 291—2)

This invention relates to track sanders and particularly to a timed sanding arrangement which may be put into action by various means, but is particularly useful with what has come to be known as anti-slide decelostat control.

At least two types of decelostat are in commercial use (one being mechanical and another electrical). Each type is arranged to respond to excessively rapid deceleration of corresponding wheels, such as occurs when wheel slipping has started and sliding is imminent. Each decelostat functions to release the brake application on the slipping wheels, to a point at which resumption of normal rotation of the wheel is assured, and then acts to permit the brakes to reapply.

The invention provides a sander control which is conditioned to operate by the occurrence of a brake application, is started into action by the brake releasing function of the decelostat and thereafter continues to sand to the end of a substantially uniform period measured from the reapplication of the brakes.

The desired result is secured by simple means, which can be connected in various ways so as to be triggered by the brake releasing action of the decelostat. As a practical matter it can be arranged to respond to the fall of brake cylinder pressure while the relay continues to function to produce an application, though other simple arrangements are available.

In modern passenger brakes a control valve responds to brake pipe pressure and pilots a relay. The relay admits air to the brake cylinder from a supply reservoir, seeks to maintain brake cylinder pressure during the application and exhausts the brake cylinders, all according to pressures established in the brake pipe. Thus recurrent applications and releases may be made rapidly and frequently. The invention will be described as used with such a system, but only those components of the system which are directly related to the sanding system will be illustrated and these, being conventional, require only brief description.

In the drawing the single figure is largely diagrammatic so parts are not drawn to scale. The valves which control sanding air are shown in section, and other parts in elevation.

Conventional parts of a passenger brake system will first be described. A pipe 1 leads from the usual relay (not shown) to the pipe bracket 2 of the decelostat valve. The pipe bracket supports the venting valve 3 and the protection valve 4 and affords a single element to which all pipe connections are made.

These connections are shown and comprise, in addition to pipe 1, a decelostat pipe 5 whose branches 6 (two being shown) lead to different decelostats 10, one driven by each pair of wheels on a truck or other unit which is braked as a group. Also connected to bracket 2 is the brake cylinder pipe 7 which leads to brake cylinders 8 for the truck (or other unit). Two such cylinders are shown, as the drawings assume a two axle (four wheel) truck.

The decelostats comprise normally closed valves, controlling exhaust from the respective branches 6 and mechanism which opens the related one of said valves if the corresponding wheels decelerate at a greater rate than that for which the decelostats are set. Slipping conditions are indicated by a rate of deceleration which slightly exceeds such rate.

When a brake application is made the relay supplies compressed air to pipe 1 and thence through pipe 7 to the brake cylinders 8, applying the brakes. If the resulting rate of deceleration does not exceed the chosen rate the decelostats 10 do not vent either branch 6.

However, if either pair of wheels in the truck starts to slip as a result of the brake application, the excessive deceleration of the slipping wheels will cause the corresponding decelostat to vent the corresponding branch 6, in which case valve 3 will shift to disconnect pipe 7 from pipe 1 (which remains under pressure) and vent pipe 7 and consequently both brake cylinders 8. Protection valve 4 will function to perpetuate this condition until brake cylinder pressure reaches a value low enough to assure that the wheels will resume normal rotation (six pounds per sq. in. is an acceptable value). Rotation of the wheels causes the decelostat vent valve to close and reduction of brake cylinder pressure to said low value (assumed to be 6 p. s. i.) resets valves 3 and 4, whereupon normal connections exist and the brakes reapply to a pressure determined by the relay.

The construction and functions so far outlined are characteristic of a known brake system with slide preventing decelostats.

The sander, which is the subject of the present invention, is conditioned to operate by the application of the brakes, is put into action by the response of the decelostats and becomes effective at approximately the time the brakes are substantially released by the decelostat, and thereupon causes sanding for a time interval which starts with reapplication of the brakes and continues for a substantially uniform time interval thereafter.

The sander controlling element is a vent valve, here shown as a body 11 and a cap 12 enclosing chambers 13 and 14 separated by a flexible diaphragm 15 whose marginal portion serves as a gasket between the body and cap. Clamped to the center of the diaphragm are thrust discs 16 and 17, the upper one of which serves as a seat for biasing spring 18 and the lower one of which carries a valve stem 19 which make a close sliding fit in bushing 21 and normally closes against exhaust seat 22 to close an exhaust from chamber 23.

Chamber 14 is in free communication with brake cylinder pipe 7 and brake cylinders 8. Chamber 13 communicates with pipe 1 from the relay by way of choke 24 which is used to stabilize action. Both chambers 13 and 14 are at atmospheric pressure when brakes are released. During an application, chamber 14 charges somewhat faster than chamber 13, so that valve stem remains down. During a normal release of the brake cylinders the diaphragm will not move up, because it will not develop force enough to overpower spring 18. However, if a decelostat operates in response to slipping, pipe 7 and chamber 14 will be vented while pipe 1 and chamber 13 remain under pressure. This causes valve 19 to open.

A reservoir 25 for sanding air is kept charged by any suitable means (not shown) and supplies air for operating any desired number of rail sanders (not shown) through pipe connection 26 to sanding control valve body 27 and thence through pipe 28 to the sanders.

In body 27 between connections 26 and 28 is a valve seat 29. A cup-shaped cylindrical valve 31, larger than seat 29 has on its lower end a valve gasket 32 which engages seat 29. The valve 31 is reciprocable in a cylindrical guide way, which it fills, and is biased in a closing direction by a coil compression spring 33. There is a restricted passage 34 which connects reservoir 25 with the space 35 behind (above) valve 31. A pipe 36 and timing volume 37 connect chamber 35 with chamber 23.

*Operation*

Assume that the system is charged and that the train is running with the brakes released. The chambers 13 and 14 will be at atmospheric pressure as will be the pipe 1. If a brake application is then made, pressure will rise in pipe 1 and the brakes will apply in the ordinary way. The pressures in the chambers 13 and 14 will rise to the same final value, which is the value of pressure in the brake cylinders during the application, but the effect of the choke 24 will be to cause the rising pressure in the lower chamber 13 to lag slightly behind the pressure in the chamber 14. Because of this and the reaction of the spring 18, the valve stem 19 has no tendency to open. Under these conditions the valve 31 will remain closed on its seat and the space 35, timing reservoir 37 and chamber 23 will be under the supply pressure furnished by the sanding reservoir 25. If the brakes are released in the ordinary way pressures in the chambers 13 and 14 will fall so nearly at the same rate that valve 19 will not open.

Assume that an application is made, and that as a consequence of the application at least one pair of wheels starts to slip, a condition which would quickly result in wheel sliding unless the brakes are substantially completely released. The response of the corresponding decelostat will cause the valves 3 and 4 to operate and vent both cylinders 8 to atmosphere while pipe 1 remains under the pressure developed by the relay. The protection valve ensures that this action will continue until a definite low brake cylinder pressure is reached. A satisfactory low pressure for the intended purpose is 6 p. s. i. As a consequence, pressure in chamber 14 falls almost instantly to 6 lbs. while the pressure in chamber 13 and pipe 1 is not reduced at all.

The vent valve 19 opens, venting the chamber 23, timing reservoir 37 and the space 35 above the valve. Since the valve 31 is larger than its seat 29 it is subjected in an opening direction over a limited annular area to pressure in the reservoir 25. The restricted passage 34 is so small that pressure in the space 35 drops to atmospheric almost instantly. It follows that valve 31 opens wide, delivers air from the reservoir 25 to the pipe 28 which can be made large enough to feed any desired number of sanders. Ordinarily it would supply sanders which sand the wheels to which the decelostats are applied. As soon as the slipping wheel is freed by the brakes it starts to accelerate and the decelostat or decelostats cease their venting functions, so that pressure is restored in the pipe 5, the valves 3 and 4 reset, and the brakes start to reapply. Shortly thereafter brake cylinder pressure acts in chamber 14 to cause the vent valve 19 to close, closing the exhaust from timing chamber 37.

Air from the reservoir 25 will flow through the restricted passage 34, and at a retarded rate will charge the space 35, the timing volume 37 and the chamber 23. When charging is nearly complete the spring 33 will become effective to close the valve 31, whereupon sanding will cease.

Inasmuch as timed sanding occurs during the charging phase for reservior 37, it is obvious that sanding operations can succeed one another at intervals shorter than the timed sanding period. Furthermore, the timing is substantially uniform. If pressure in reservoir 25 has been depleted by prior sanding operations the pressure to which the timing reservoir 37 is charged will be similarly reduced. As a consequence, the timing period is not greatly influenced by depletion of pressure in the sanding reservoir 25.

While the vent valve in the body 11 and 12 is considered highly satisfactory for its purpose, various other valves might be used to vent the timing reservoir 37. The possibility of their substitution is fully recognized. The valve in body 27, with its timing port and its timing reservoir, are considered to be the most important aspects of the invention for they afford a very simple valve mechanism which can be accurately timed, which can function repeatedly at short intervals, and which gives sufficiently precise timing regardless of depletion of the charge in the supply reservoir 25.

What is claimed is:

1. Means for delivering compressed air to sanders and the like, comprising in combination, a source of air under pressure; a valve controlling flow from said source to the sander; means constantly biasing said valve in a closing direction; a double acting pressure motor connected to shift said valve and having two oppositely acting working spaces, the first of which is constantly subject to the air pressure in said source and the second of which is in restricted communication with the first; means forming a timing volume in communication with said second working space; a normally closed sanding control vent valve operable to vent said timing volume; an air brake system including brake cylinders and wheel slip detecting means serving under slipping conditions to isolate the brake cylinders from the brake system, vent the brake cylinders and then close said vent and permit the cylinders to recharge; and a device controlled by said slip detecting means and serving to open the normally closed sanding control vent valve as the cylinders are vented by the slip detecting means and close it as pressure develops in the cylinders.

2. Means for delivering compressed air to sanders and the like, comprising in combination, a source of air under pressure; a valve controlling flow from said source to the sander; means constantly biasing said valve in a closing direction; a double acting pressure motor connected to shift said valve and having two oppositely acting working spaces, the first of which is constantly subject to the air pressure in said source and the second of which is in restricted communication with the first; means forming a timing volume in communication with said second working space; a normally closed sanding control vent valve operable to vent said timing volume; an air brake system including brake cylinders and wheel slip detecting means serving under slipping conditions to isolate the brake cylinders from the system, vent the brake cylinders, then close said vent and permit the cylinders to recharge; and pneumatic means normally indifferent to brake cylinder pressure but rendered responsive to reduction of brake cylinder pressure upon the operation of said slip detecting means in response to slip, and then serving to open said sanding control vent valve and maintain it open while brake cylinder pressure remains so reduced.

3. The combination of an air brake system having a pipe which is alternately put under sustained pressure and vented to apply and release the brakes; at least one brake cylinder normally connected with said pipe; slip detecting means serving in response to slip to disconnect said brake cylinder from said pipe and vent the brake cylinder, then close the vent and cause the cylinder to recharge; a sanding air connection; sanding control means responsive to pressure differentials between said pipe and cylinder and arranged to start the supply of air to the sanding connection when the cylinder is vented while the pipe is under pressure; and timing means conditioned to act by said venting of the brake cylinder and rendered active by recharge of the brake cylinder to maintain the supply of air to the sanding connection for a definite period after said recharge.

4. The combination of an air brake system having a pipe which is alternately put under sustained pressure and vented to apply and release the brakes; at least one brake cylinder normally connected with said pipe; slip detecting means serving in response to slip to disconnect said brake cylinder from said pipe and vent the brake cylinder, then close the vent and cause the cylinder the recharge; a sanding air connection; a vent valve of the differential pressure type charged from the brake cylinder and from said pipe, subject to the pressure differential therebetween and arranged to open when brake cylinder pressure is reduced while pipe pressure is maintained; and a timed valve device arranged to be opened and conditioned for timed closure by the opening of said vent valve and started in its timing function by closure of the vent valve, whereby timed sanding persists for a period measured from the restoration of brake cylinder pressure.

JOHN VAN VARICK ELSWORTH.

REFERENCES CITED

The following references are of record in the file of this patent:

UNITED STATES PATENTS

| Number | Name | Date |
|---|---|---|
| 833,307 | Dake | Oct. 16, 1906 |
| 1,598,994 | Wallace | Sept. 7, 1926 |
| 1,787,686 | Kerr | Jan. 6, 1931 |
| 2,148,383 | Tyden | Feb. 21, 1939 |
| 2,198,031 | Farmer | Apr. 23, 1940 |
| 2,243,450 | Aikman | May 27, 1941 |
| 2,275,647 | Pickert | Mar. 10, 1942 |
| 2,386,006 | Safford | Oct. 2, 1945 |

Certificate of Correction

Patent No. 2,492,276                                                            December 27, 1949

JOHN VAN VARICK ELSWORTH

It is hereby certified that error appears in the printed specification of the above numbered patent requiring correction as follows:

Column 6, line 19, for the words "the recharge" read *to recharge*;

and that the said Letters Patent should be read with this correction therein that the same may conform to the record of the case in the Patent Office.

Signed and sealed this 4th day of April, A. D. 1950.

[SEAL]

THOMAS F. MURPHY,
                                                           *Assistant Commissioner of Patents.*